(12) United States Patent
Miyamoto

(10) Patent No.: US 8,240,688 B2
(45) Date of Patent: Aug. 14, 2012

(54) SUPPORT STRUCTURE FOR STABILIZER AND SUPPORT METHOD FOR STABILIZER

(75) Inventor: Yasuo Miyamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 12/665,781

(22) PCT Filed: Jul. 8, 2008

(86) PCT No.: PCT/JP2008/062334
§ 371 (c)(1),
(2), (4) Date: Dec. 21, 2009

(87) PCT Pub. No.: WO2009/008425
PCT Pub. Date: Jan. 15, 2009

(65) Prior Publication Data
US 2010/0176544 A1   Jul. 15, 2010

(30) Foreign Application Priority Data

Jul. 12, 2007  (JP) ................................. 2007-182823

(51) Int. Cl.
*B60G 21/055* (2006.01)
*B60G 11/20* (2006.01)

(52) U.S. Cl. ................. 280/124.107; 267/189; 267/276; 280/124.152; 280/124.106

(58) Field of Classification Search ........... 280/124.107, 280/124.1, 124.152, 124.106, 124.166, 124.169; 267/189, 188, 183, 276
See application file for complete search history.

(56) References Cited

U.S. PATENT DOCUMENTS

| 4,854,766 | A | * | 8/1989 | Hein ............................. 403/224 |
| 4,951,962 | A | * | 8/1990 | Tomida et al. .......... 280/124.108 |
| 5,890,704 | A | * | 4/1999 | Tsutsumida ............. 267/140.12 |
| 6,854,750 | B2 | * | 2/2005 | Carlstedt et al. ........ 280/124.169 |

(Continued)

FOREIGN PATENT DOCUMENTS

| DE | 197 40 995 A1 | 3/1998 |
| JP | 56-45636 U | 9/1954 |
| JP | 59-47138 U | 3/1984 |
| JP | 62-19408 U | 2/1987 |
| JP | 11-291736 A | 10/1999 |
| JP | 2004-257541 A | 9/2004 |
| JP | 2006-144837 | 6/2006 |

*Primary Examiner* — Ruth Ilan
*Assistant Examiner* — Karen A Beck
(74) *Attorney, Agent, or Firm* — Carrier Blackman & Associates, P.C.; William D. Blackman; Joseph P. Carrier

(57) ABSTRACT

Forming a recess in an intermediate section in an axis direction of an outer peripheral face of a stabilizer bush allows the contact surface pressure between an inner peripheral face thereof and an outer peripheral face of a torsion portion to be low in a section where the recess is formed. Therefore, when the torsion portion twistedly deforms, slipping against the torsion portion starts from the intermediate section in the axis direction of the stabilizer bush, and the slipping spreads to opposite end parts in the axis direction, thus enhancing the ride comfort of a vehicle. Moreover, open ends of axially opposite end parts of the stabilizer bush, where no recess is formed, are put in intimate contact with the outer peripheral face of the torsion portion, thus preventing sand and mud from entering therefrom.

12 Claims, 9 Drawing Sheets

U.S. PATENT DOCUMENTS

| | | | |
|---|---|---|---|
| 6,889,988 B2* | 5/2005 | Cai et al. | 280/124.107 |
| 7,318,593 B2* | 1/2008 | Sterly et al. | 280/124.106 |
| 7,380,775 B2* | 6/2008 | Niwa et al. | 267/293 |
| 7,828,308 B2* | 11/2010 | Hansson et al. | 280/124.152 |
| 2004/0075235 A1 | 4/2004 | Cai et al. | |
| 2005/0029769 A1* | 2/2005 | Furuyama et al. | 280/124.107 |
| 2006/0091595 A1* | 5/2006 | Hayashi et al. | 267/276 |
| 2010/0001448 A1* | 1/2010 | Miyamoto | 267/276 |
| 2010/0176544 A1* | 7/2010 | Miyamoto | 267/189 |
| 2011/0025013 A1* | 2/2011 | Kuroda | 280/124.152 |
| 2011/0115182 A1* | 5/2011 | Kuroda | 280/124.106 |
| 2011/0291377 A1* | 12/2011 | Kato et al. | 280/124.107 |

* cited by examiner

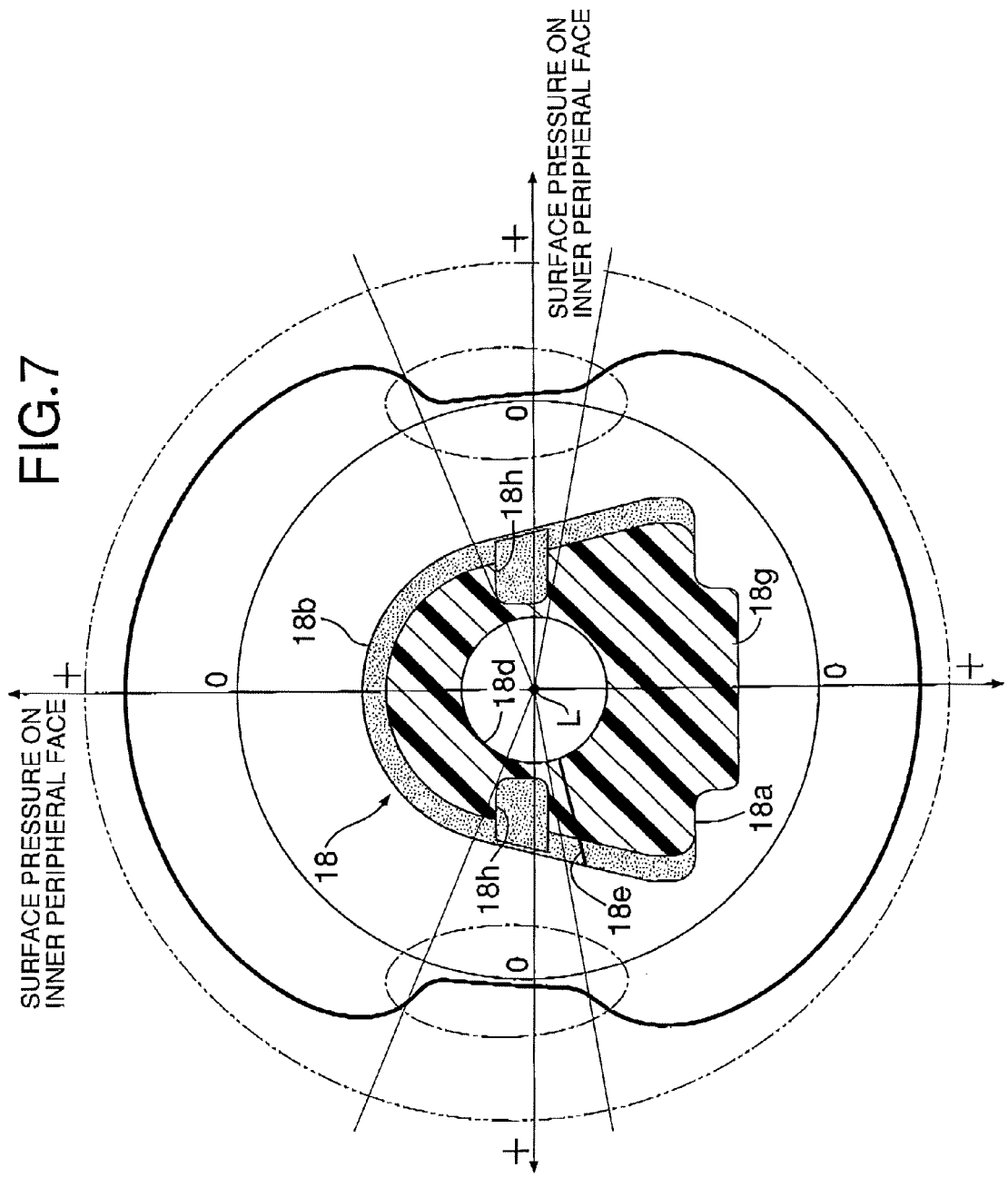

US 8,240,688 B2

SUPPORT STRUCTURE FOR STABILIZER AND SUPPORT METHOD FOR STABILIZER

TECHNICAL FIELD

The present invention relates to a support structure for a stabilizer and a support method for a stabilizer in which an outer peripheral face of a torsion portion of a stabilizer that connects left and right suspension systems is gripped by an inner peripheral face of a tubular stabilizer bush, and an outer peripheral face of the stabilizer bush is clamped under pressure and fixed between a mounting part of a vehicle body and a fixing member fixed to the vehicle body.

BACKGROUND ART

With regard to an arrangement in which a stabilizer bush is fitted around the outer periphery of a torsion portion of a stabilizer that connects left and right suspension systems, and the stabilizer bush is supported on a vehicle body in a state in which it is clamped by a bracket and compressed radially inwardly, one in which an axially extending cutout part is formed in an outer peripheral face of the stabilizer bush to thus decrease the contact surface pressure on an outer peripheral face of the torsion portion and enable the torsion portion to easily rotate relative to the stabilizer bush, thereby preventing the occurrence of abnormal noise, is known from Patent Publication 1 below.
Patent Publication 1: Japanese Patent Application Laid-open No. 11-291736

DISCLOSURE OF INVENTION

Problems to be Solved by the Invention

However, in the above-mentioned conventional arrangement, since the cutout part is formed along the whole axial length of the stabilizer bush, when the stabilizer is twistedly deformed due to left and right wheels moving vertically with opposite phases, if a radial load is applied to the stabilizer bush from the stabilizer, sliding faces of the stabilizer bush and the torsion portion open up, and there are the problems that sand and mud enter between the sliding faces to thus cause abnormal noise, and wear of the surface of the stabilizer is accelerated.

The present invention has been accomplished in the light of the above-mentioned circumstances, and it is an object thereof to prevent sand and mud from entering between sliding faces of a stabilizer bush and a stabilizer while preventing the occurrence of abnormal noise and degradation in ride comfort by reducing the surface pressure between the sliding faces.

Means for Solving the Problems

In order to attain the above object, according to a first aspect of the present invention, there is provided a support structure for a stabilizer in which an outer peripheral face of a torsion portion of a stabilizer that connects left and right suspension systems is gripped by an inner peripheral face of a tubular stabilizer bush, and an outer peripheral face of the stabilizer bush is clamped under pressure and fixed between a mounting part of a vehicle body and a fixing member fixed to the vehicle body, characterized in that a radially inwardly extending recess is formed in an intermediate section, excluding opposite end parts, in a direction of an axis of the outer peripheral face of the stabilizer bush.

The recess includes one that has a dead end and does not reach the inner peripheral face of the stabilizer bush and one that extends through to the inner peripheral face of the stabilizer bush.

According to a second aspect of the present invention, in addition to the first aspect, when a cross-section of the stabilizer bush in the axis direction is viewed, a bottom face of the recess is formed substantially parallel to the axis direction.

According to a third aspect of the present invention, in addition to the first aspect, the stabilizer bush has a slit that provides communication from the outer peripheral face to the inner peripheral face, and a second recess is formed on an end face in the axis direction of the stabilizer bush so as to avoid the slit.

According to a fourth aspect of the present invention, in addition to the third aspect, the second recess is formed in a C shape further outside than the inner peripheral face of the stabilizer bush.

According to a fifth aspect of the present invention, in addition to the first aspect, the recess is formed on the vehicle body front side and the vehicle body rear side of the torsion portion.

According to a sixth aspect of the present invention, in addition to the fifth aspect, a resilient membrane portion is formed between the bottom of the recess and the inner peripheral face, and an average thickness of the resilient membrane portion is smaller than an average depth of the recess.

According to a seventh aspect of the present invention, in addition to the sixth aspect, the average thickness of the resilient membrane portion is smaller than a length in the width direction of the recess that is perpendicular to both the depth direction of the recess and the axis direction.

According to an eighth aspect of the present invention, in addition to the first aspect, the recess extends through to the inner peripheral face, a lip is formed on at least one side in the peripheral direction of a section where the recess communicates with the inner peripheral face, the lip being in contact with the outer peripheral face of the torsion portion, and a radial thickness of the lip increases in going from the tip side toward the base side.

According to a ninth aspect of the present invention, there is provided a support method for a stabilizer in which an outer peripheral face of a torsion portion of a stabilizer that connects left and right suspension systems is gripped by an inner peripheral face of a tubular stabilizer bush, and an outer peripheral face of the stabilizer bush is clamped under pressure and fixed between a mounting part of a vehicle body and a fixing member fixed to the vehicle body, characterized in that a radially inwardly extending recess is formed in an intermediate section, excluding opposite end parts, in a direction of an axis of the outer peripheral face of the stabilizer bush.

The recess includes one that has a dead end and does not reach the inner peripheral face of the stabilizer bush and one that extends through to the inner peripheral face of the stabilizer bush.

According to a tenth aspect of the present invention, in addition to the ninth aspect, when a cross-section of the stabilizer bush in the axis direction is viewed, a bottom face of the recess is formed substantially parallel to the axis direction.

According to an eleventh aspect of the present invention, in addition to the ninth aspect, the stabilizer bush has a slit that provides communication from the outer peripheral face to the inner peripheral face, and a second recess is formed on an end face in the axis direction of the stabilizer bush so as to avoid the slit.

According to a twelfth aspect of the present invention, in addition to the eleventh aspect, the second recess is formed in a C shape further outside than the inner peripheral face of the stabilizer bush.

According to a thirteenth aspect of the present invention, in addition to the ninth aspect, the recess is formed on the vehicle body front side and the vehicle body rear side of the torsion portion.

According to a fourteenth aspect of the present invention, in addition to the thirteenth aspect, a resilient membrane portion is formed between the bottom of the recess and the inner peripheral face, and an average thickness of the resilient membrane portion is smaller than an average depth of the recess.

According to a fifteenth aspect of the present invention, in addition to the fourteenth aspect, the average thickness of the resilient membrane portion is smaller than a length in the width direction of the recess that is perpendicular to both the depth direction of the recess and the axis direction.

According to a sixteenth aspect of the present invention, in addition to the ninth aspect, the recess extends through to the inner peripheral face, a lip is formed on at least one side in the peripheral direction of a section where the recess communicates with the inner peripheral face, the lip being in contact with the outer peripheral face of the torsion portion, and a radial thickness of the lip increases in going from the tip side toward the base side.

Effects of the Invention

In accordance with the first or ninth aspect of the present invention, since the radially inwardly extending recess is formed in the intermediate section, excluding opposite end parts, in the axis direction of the outer peripheral face of the stabilizer bush, when the outer peripheral face is clamped and fixed between the mounting part of the vehicle body and the fixing member, it is possible to reduce the contact surface pressure between the inner peripheral face of the stabilizer bush and the outer peripheral face of the torsion portion of the stabilizer in a section where the recess is formed. Therefore, when the left and right wheels move vertically in phase and the torsion portion of the stabilizer rotates, slipping against the torsion portion starts from the intermediate section in the axis direction of the stabilizer bush where the contact surface pressure is low, this slipping spreads to axially opposite end parts, and the torsion portion can thus slip smoothly against the whole stabilizer bush, thus enabling the torsion portion to freely twistedly deform and thereby enhancing the ride comfort of the vehicle. Moreover, since the recess is not formed in axially opposite end parts of the stabilizer bush, it is possible to make the open end of the inner peripheral face of the stabilizer bush be in intimate contact with the outer peripheral face of the torsion portion, thereby preventing sand and mud from entering therefrom.

Furthermore, in accordance with the second or tenth aspect of the present invention, when a cross section of the stabilizer bush in the axis direction is viewed, since the bottom face of the recess is formed substantially parallel to the axis direction, the contact surface pressure between the outer peripheral face of the torsion portion and the inner peripheral face of the stabilizer bush can be decreased effectively.

Moreover, in accordance with the third or eleventh aspect of the present invention, since the slit is formed in the stabilizer bush so as to provide communication from the outer peripheral face to the inner peripheral face, and the second recess is formed in an axial end face of the stabilizer bush so as to avoid the slit, it is possible to suppress yet more effectively opening of the slit by reducing the rigidity of a section, excluding the vicinity of the slit, of a side face of the stabilizer bush by means of the second recess and enhancing only the rigidity of the vicinity of the slit compared with other sections.

Furthermore, in accordance with the fourth or twelfth aspect of the present invention, since the second recess is formed in a C shape further outside than the inner peripheral face of the stabilizer bush, it is possible to reliably enhance only the rigidity of the vicinity of the slit compared with other sections.

Moreover, in accordance with the fifth or thirteenth aspect of the present invention, when the left and right wheels move vertically with opposite phases and the torsion portion of the stabilizer twistedly deforms, although a vertical load is applied to the stabilizer bush, which supports opposite ends of the torsion portion, since the recesses of the stabilizer bush are formed on the vehicle body front side and the vehicle body rear side of the torsion portion, it is possible to guarantee the rigidity of the stabilizer bush for the vertical load and prevent excessive deformation, thus enabling the stabilizer to be stably supported by means of the stabilizer bush.

Furthermore, in accordance with the sixth or fourteenth aspect of the present invention, since the average thickness of the resilient membrane portion formed between the inner peripheral face and the bottom of the recess of the stabilizer bush is set smaller than the average depth of the recess, it is possible to reduce effectively the rigidity of the stabilizer bush by means of the recess, thereby sufficiently decreasing the contact surface pressure between the resilient membrane portion and the outer peripheral face of the torsion portion. Slipping thus starts from the section with a decreased contact surface pressure, and due to this slipping spreading to the entirety, the torsion portion can be smoothly rotated against the stabilizer bush.

Moreover, in accordance with the seventh or fifteenth aspect of the present invention, since the average thickness of the resilient membrane portion is set smaller than the length in the width direction of the recess that is perpendicular to both the depth direction of the recess and the direction of the axis, it is possible to decrease yet more effectively the rigidity of the stabilizer bush by means of the recess, thus more sufficiently decreasing the contact surface pressure between the resilient membrane portion and the outer peripheral face of the torsion portion.

Furthermore, in accordance with the eighth or sixteenth aspect of the present invention, since the recess of the stabilizer bush extends through to the inner peripheral face, compared with one in which the resilient membrane portion is formed between the inner peripheral face and the bottom of the recess of the stabilizer bush, it is possible to further reduce the average contact surface pressure of the sliding faces. Moreover, since the lip that is formed in a communication part where the recess communicates with the inner peripheral face and that is in contact with the outer peripheral face of the torsion portion increases in radial thickness in going from the tip side toward the base side, it is possible to make the contact surface pressure at the tip of the lip substantially zero, and the slipping starting therefrom can be spread to the entirety, thus enabling the torsion portion to be smoothly rotated against the stabilizer bush.

BRIEF DESCRIPTION OF DRAWINGS

FIG. 7 is a diagram showing pressure distribution on a sliding face of the stabilizer bush. (first embodiment)

EXPLANATION OF REFERENCE NUMERALS AND SYMBOLS

14 Stabilizer
15 Torsion portion
18 Stabilizer bush
18a First outer peripheral face (outer peripheral face)
18b Second outer peripheral face (outer peripheral face)
18d Inner peripheral face
18e Slit
18h Recess
18i Resilient membrane portion
18j Lip
18k Second recess
S Suspension system
W Wheel
w Radial thickness of lip
α Average thickness of resilient membrane portion
β Average depth of recess
γ Length in width direction of recess

BEST MODE FOR CARRYING OUT THE INVENTION

Embodiments of the present invention are explained below by reference to the attached drawings.

Embodiment 1

FIG. 1 to FIG. 8 show a first embodiment.

Figure 1:
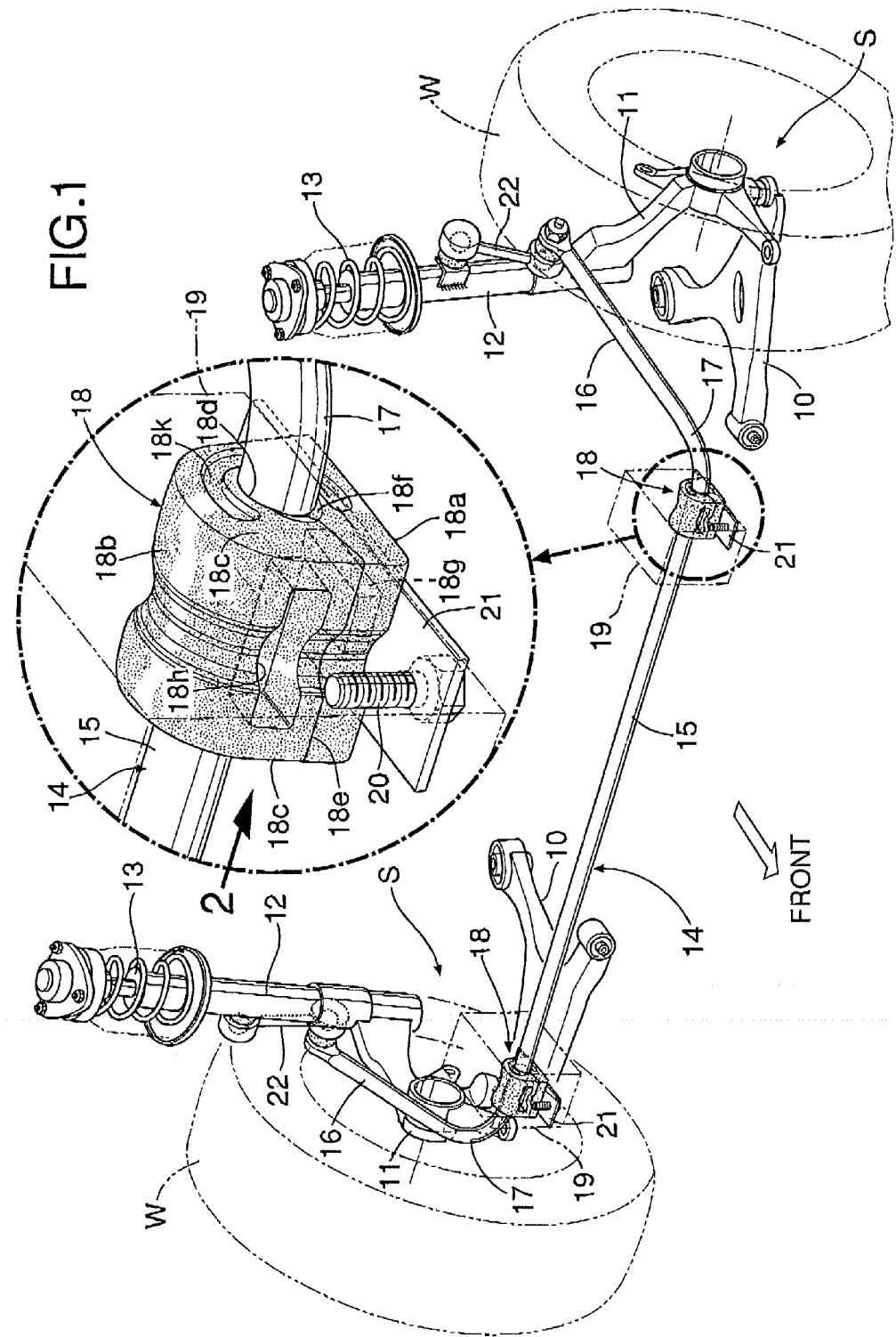
FIG. 1 is a perspective view showing a mounting state of a stabilizer on a vehicle. (first embodiment)
Figure 2:
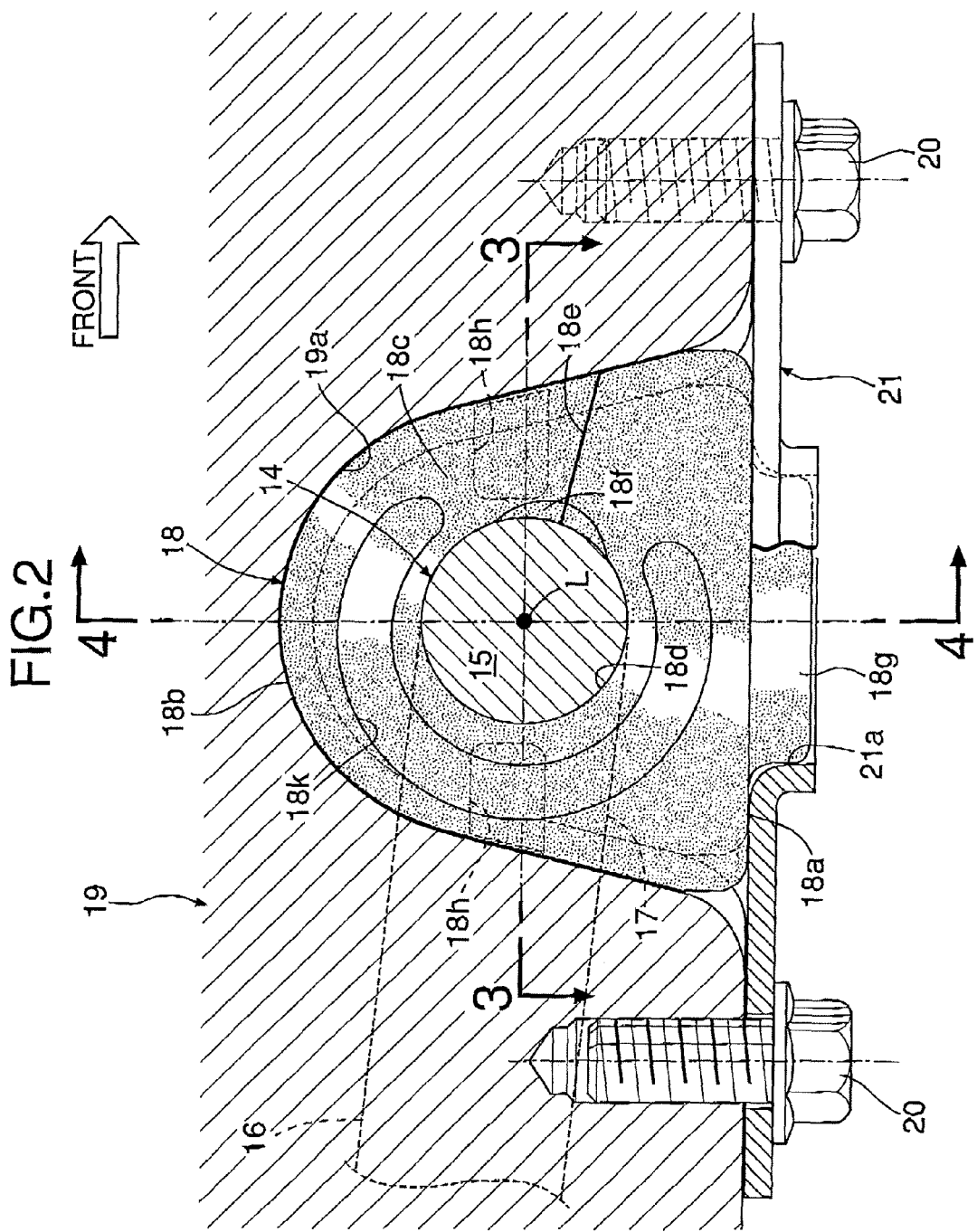
FIG. 2 is an enlarged view from the direction of arrow 2 in FIG. 1. (first embodiment)

As shown in FIG. 1, strut type suspension systems S and S suspending left and right wheels W and W include left and right knuckles 11 and 11 vertically movably supported on a vehicle body via suspension arms 10 and 10, dampers 12 and 12 connected to upper parts of the knuckles 11 and 11 and extending upward, suspension springs 13 and 13 disposed coaxially on the outer periphery of upper parts of the dampers 12 and 12, and a stabilizer 14 providing a connection between the upper parts of the left and right knuckles 11 and 11.

The stabilizer 14 includes a torsion portion 15 extending linearly in the vehicle width direction, left and right arm portions 16 and 16 extending linearly from opposite ends of the torsion portion 15 toward the rear of the vehicle body, and left and right curved portions 17 and 17 providing smooth connections between the torsion portion 15 and the arm portions 16 and 16. Extremities of the left and right arm portions 16 and 16 are connected to the dampers 12 and 12 via links 22 and 22. Tubular stabilizer bushes 18 and 18 made of rubber are fitted onto opposite ends of the torsion portion 15 adjacent to the left and right curved portions 17 and 17, and these stabilizer bushes 18 and 18 are supported by being clamped between a U-shaped mounting portion 19a (see FIG. 2) of a vehicle body 19 and a plate-shaped mounting bracket 21 fixed by bolts 20 and 20 to the vehicle body 19 so as to cover the mounting portion 19a.

As is clear from FIG. 2 to FIGS. 5A-5D, each stabilizer bush 18 includes a flat first outer peripheral face 18a, a second outer peripheral face 18b with a U-shaped cross-section in a direction perpendicular to an axis L and a wave-form cross-section in a direction along the axis L, a pair of side faces 18c and 18c, and a circular cross-section inner peripheral face 18d opening on the two side faces 18c and 18c and into which the torsion portion 15 of the stabilizer 14 is fitted. The diameter of the inner peripheral face 18d at opposite ends in the axis L direction is slightly smaller than the diameter of other sections.

A split groove-shaped slit 18e is formed in the stabilizer bush 18, the slit 18e being disposed within a plane containing the axis L of the stabilizer bush 18 and extending from the second outer peripheral face 18b to the inner peripheral face 18d. Furthermore, chamfered portions 18f and 18f are formed in sections where the inner peripheral face 18d opens on the side faces 18c and 18c of the stabilizer bush 18, so that the chamfered portions 18f and 18f sandwich the slit 18e from opposite sides in the circumferential direction. Moreover, a rectangular positioning projection 18g is projectingly provided in the center of the flat first outer peripheral face 18a of the stabilizer bush 18.

The chamfered portions 18f are formed only in sections on opposite sides sandwiching the slit 18e, and the shape when viewed in the axis L direction is a crescent shape curving radially outward from the inner peripheral face 18d of the stabilizer bush 18. The depth in the axis L direction of the chamfered portion 18f is the deepest at a position where the slit 18e intersects the inner peripheral face 18d of the stabilizer bush 18, and gradually becomes shallower in going radially outward therefrom and also in going toward opposite sides in the circumferential direction.

Furthermore, two long and narrow recesses 18h and 18h extending in the axis L direction are formed in front and rear faces of the second outer peripheral face 18b of the stabilizer bush 18. The recesses 18h and 18h of the stabilizer bush 18 are formed only in an intermediate section in the axis L direction of the second outer peripheral face 18b, and stop at positions prior to opposite end parts in the axis L direction. The recesses 18h and 18h do not extend through to the inner peripheral face 18d, and resilient thin membranes 18i and 18i are formed between the bottom thereof and the inner peripheral face 18d. An average thickness α of the resilient thin membrane 18i is set smaller than an average depth β of the recess 18h (see FIG. 5D).

In addition to the above-mentioned arrangement, it is preferable that the average thickness α of the resilient membrane portion 18i is smaller than a length γ, in the width direction of the recess 18h, that is perpendicular to both the depth direction of the recess 18h and the axis L direction (see FIG. 5D), and this enables a sufficient area to be guaranteed for the resilient membrane portion 18i, thereby further decreasing the contact surface pressure.

Furthermore, recesses 18k and 18k that avoid the position of the slit 18e and surround the outside of the inner peripheral face 18d in a C shape are formed in side faces 18c and 18c of the stabilizer bush 18.

The stabilizer bush 18 having the above-mentioned shape may be fitted onto the outer peripheral face of the torsion portion 15 of the stabilizer 14 by resiliently deforming the slit 18e so as to widen it. The stabilizer bush 18 is retained by fitting the U-shaped second outer peripheral face 18b into the U-shaped mounting portion 19a of the vehicle body 19 and abutting the flat first outer peripheral face 18a against the flat mounting bracket 21.

In this arrangement, the stabilizer bush 18 is positioned so that it is unable to move in the axis L direction by the positioning projection 18g of the stabilizer bush 18 being fitted into a positioning hole 21a of the mounting bracket 21 and the second outer peripheral face 18b with a wave-form cross-section along the axis L being in intimate contact with the mounting part 19a of the vehicle body 19, which has the same shape. Moreover, the stabilizer bush 18 is clamped between the vehicle body 19 and the mounting bracket 21 and compressed radially inwardly by a predetermined tightening allowance, the inner peripheral face 18d is pressed against the outer peripheral face of the torsion portion 15 of the stabilizer 14, and the slit 18e is pressed so as to close it.

The diameter of the inner peripheral face 18d, excluding opposite end parts in the axis L direction, when the stabilizer bush 18 is in a free state is formed slightly larger (e.g. 0.5 mm) than the diameter of the torsion portion 15 of the stabilizer 14 so that when it is compressed radially inward when being fixed to the mounting part 19a of the vehicle body 19 by the mounting bracket 21 the contact surface pressure between the inner peripheral face 18d of the stabilizer bush 18 and the outer peripheral face of the torsion portion 15 does not become higher than necessary. This enables a load compressing the stabilizer bush 18 radially inwardly to be applied to the slit 18e effectively, thereby giving strong intimate contact so that the slit 18e is not opened.

Furthermore, engaging parts of the curved portions 17 and 17, provided so as to be connected to opposite ends of the torsion portion 15 of the stabilizer 14, with outside end parts in the vehicle width direction of the inner peripheral faces 18d and 18d of the left and right stabilizer bushes 18 and 18 enables the stabilizer 14 to be positioned in the vehicle width direction without providing a special positioning member on the stabilizer 14.

With regard to the stabilizer 14 having the above arrangement, when the left and right wheels W and W move vertically in phase, since the left and right arm portions 16 and 16 move vertically in phase, the torsion portion 15 is not twisted, and a roll moment is not generated, but when the left and right wheels W and W move vertically with opposite phases, since the left and right arm portions 16 and 16 move vertically with opposite phases, the torsion portion 15 is twisted, and a roll moment for suppressing rolling of the vehicle body is thus generated, thereby enhancing the drivability of the vehicle.

When the left and right wheels W and W move vertically with opposite phases and the torsion portion 15 of the stabilizer 14 twistedly deforms, since a load to vertically move left and right opposite end parts of the torsion portion 15 supported by the stabilizer bushes 18 and 18 respectively is generated, the slits 18e and 18e of the stabilizer bushes 18 and 18 open from sections connected to the inner peripheral faces 18d and 18d, and there is a possibility that sand and mud will enter from a gap formed therein to thus cause the occurrence of abnormal noise or wear. In the present embodiment, it is possible to prevent the slit 18e from opening by the operation of the chamfered portions 18f and 18f formed at positions sandwiching the slit 18e in opposite end parts in the axis L direction of the inner peripheral face 18d of the stabilizer bush 18, thereby preventing sand and mud from entering.

Figure 3:
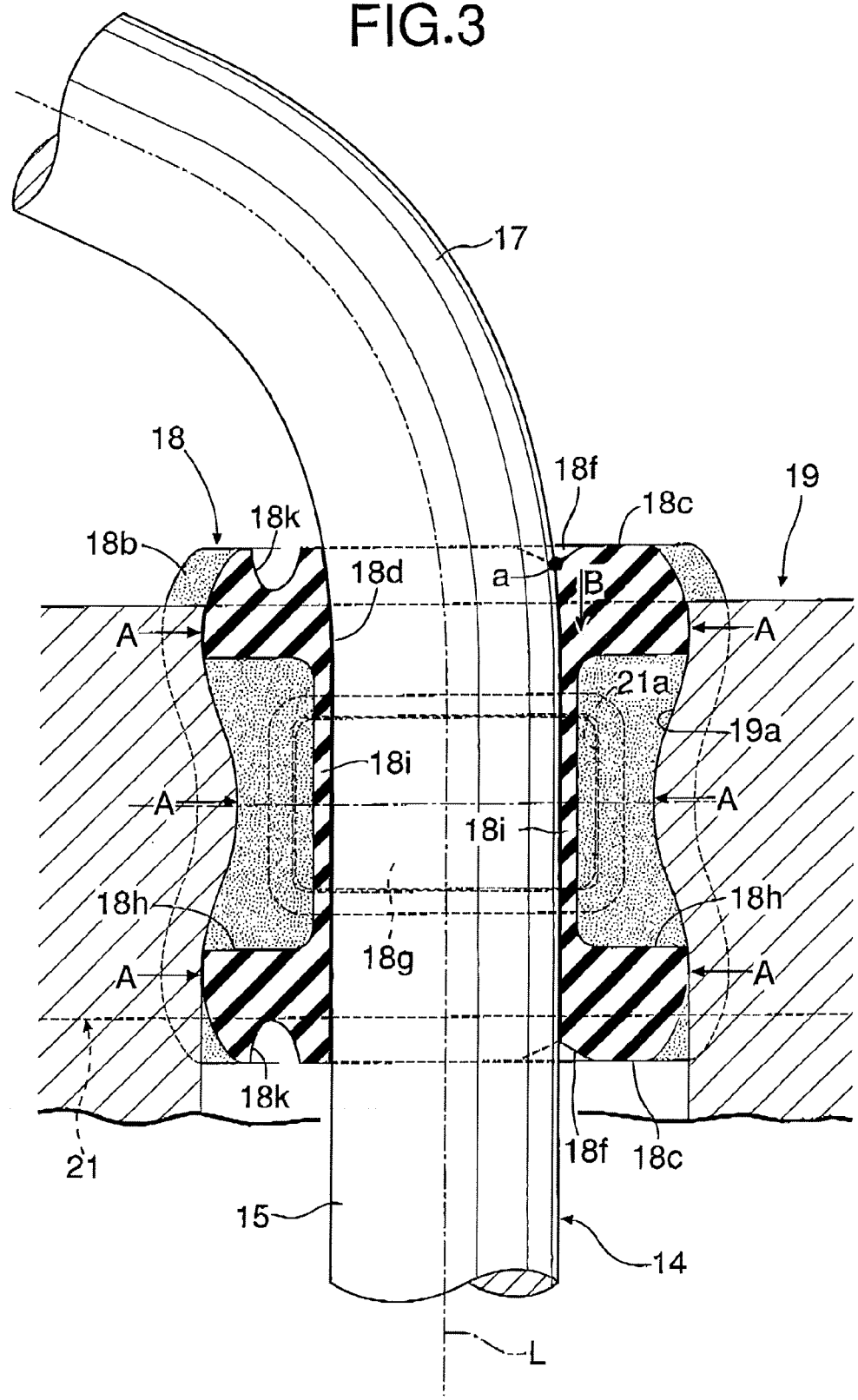
FIG. 3 is a sectional view along line 3-3 in FIG. 2. (first embodiment)
Figure 4:
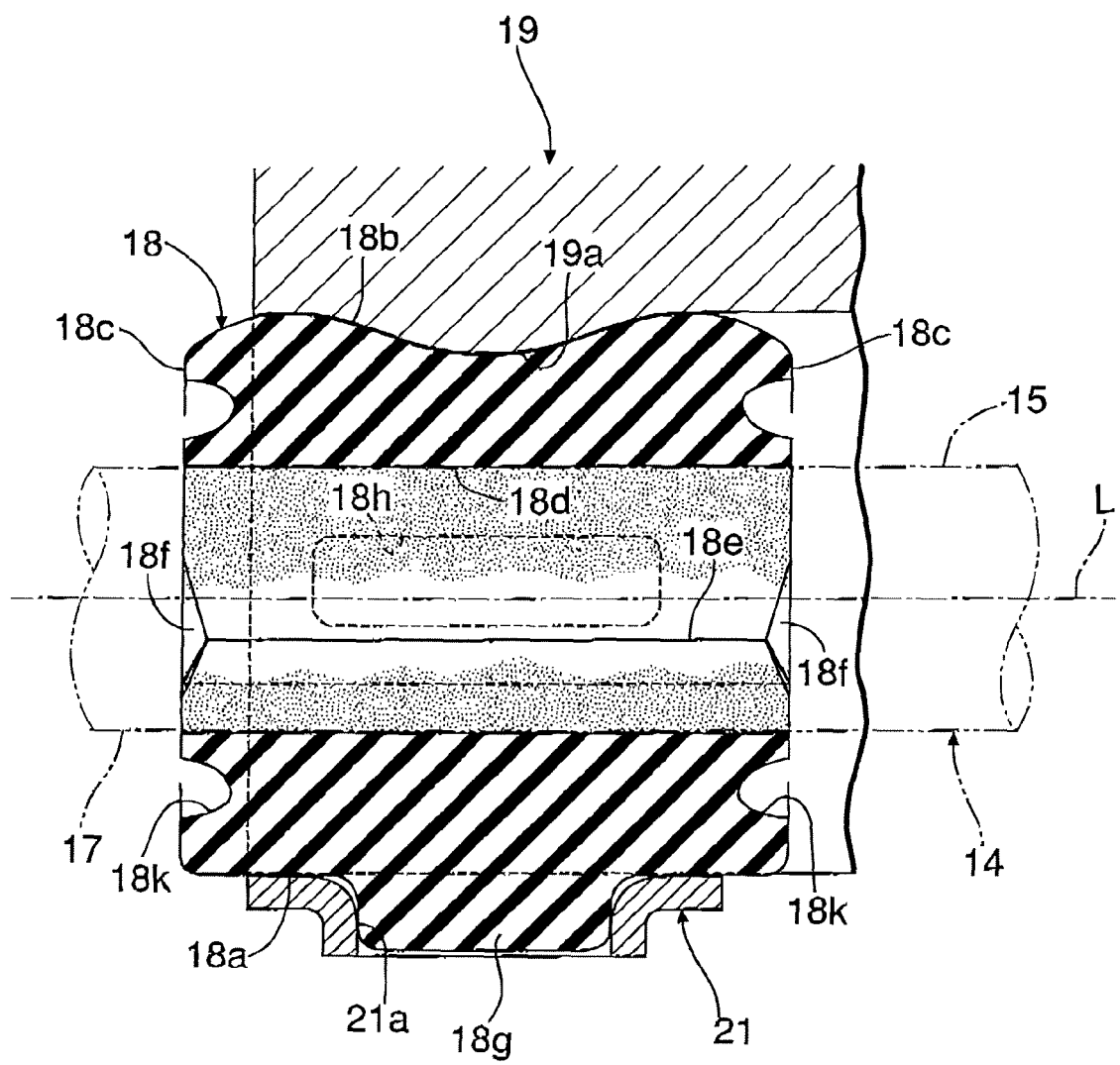
FIG. 4 is a sectional view along line 4-4 in FIG. 2. (first embodiment)
Figure 5A:
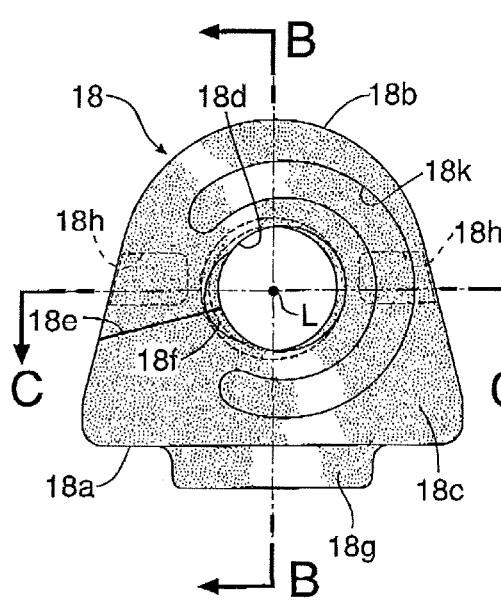
FIGS. 5A-5D are views showing the shape of a stabilizer bush. (first embodiment)
Figure 5B:
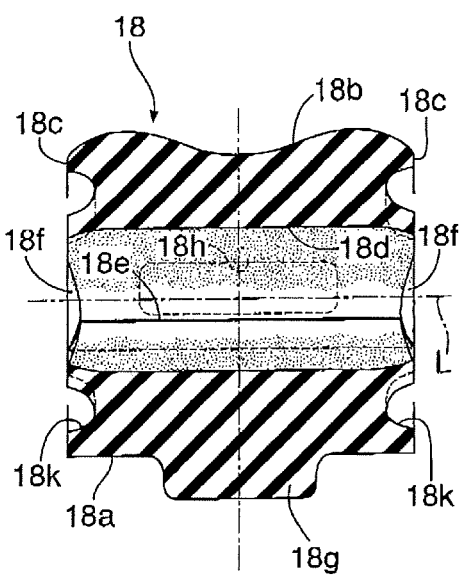
Figure 5C:
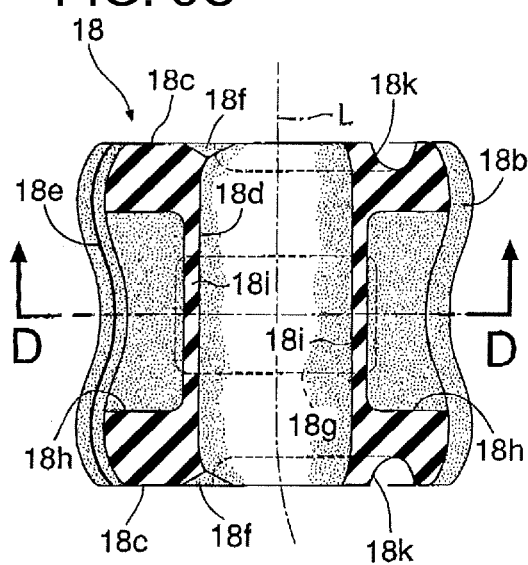
Figure 5D:
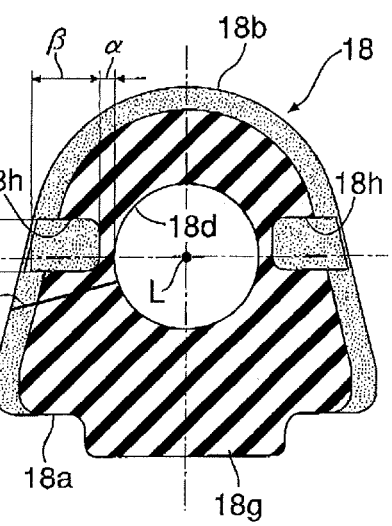

That is, since the chamfered portions 18f are provided at positions sandwiching the slit 18e in the end parts, in the axis L direction, of the inner peripheral face 18d of the stabilizer bush 18, when a compressive load A is applied thereto in a direction perpendicular to the axis L in FIG. 3, a load B facing inward in the axis L direction is generated, thus increasing the surface pressure with which a part a of the open end of the inner peripheral face 18d at the positions sandwiching the slit 18e contacts the torsion portion 15. As a result, even when a radial load is applied to the torsion portion 15, it is possible to prevent a gap from being formed between the outer peripheral face thereof and the inner peripheral face 18d of the stabilizer bush 18, thus preventing sand or mud from entering from an end part of the slit 18e. Moreover, since the stabilizer bush 18 does not have a thin lip, the durability is improved.

Figure 6A:
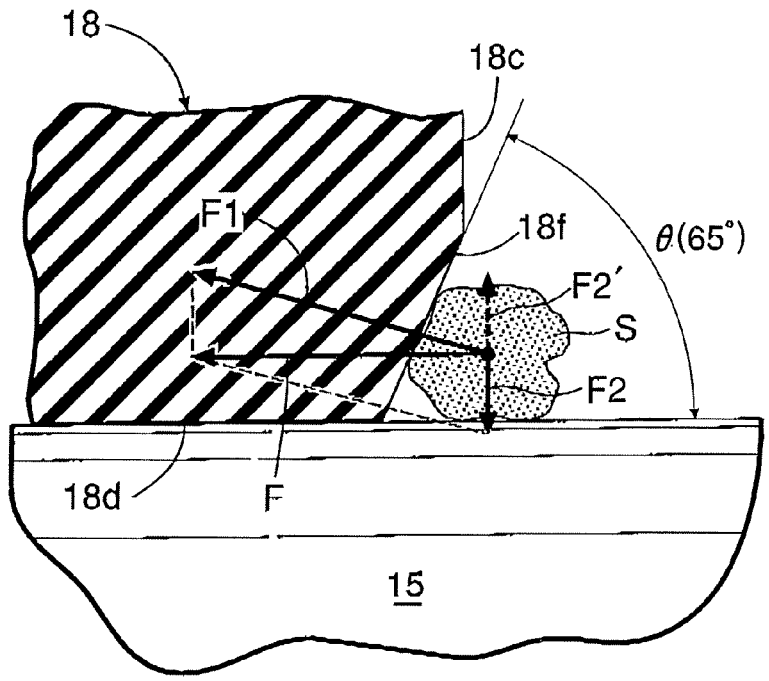
FIGS. 6A-6B are diagrams for explaining the operation of a chamfered portion of the stabilizer bush. (first embodiment)
Figure 6B:
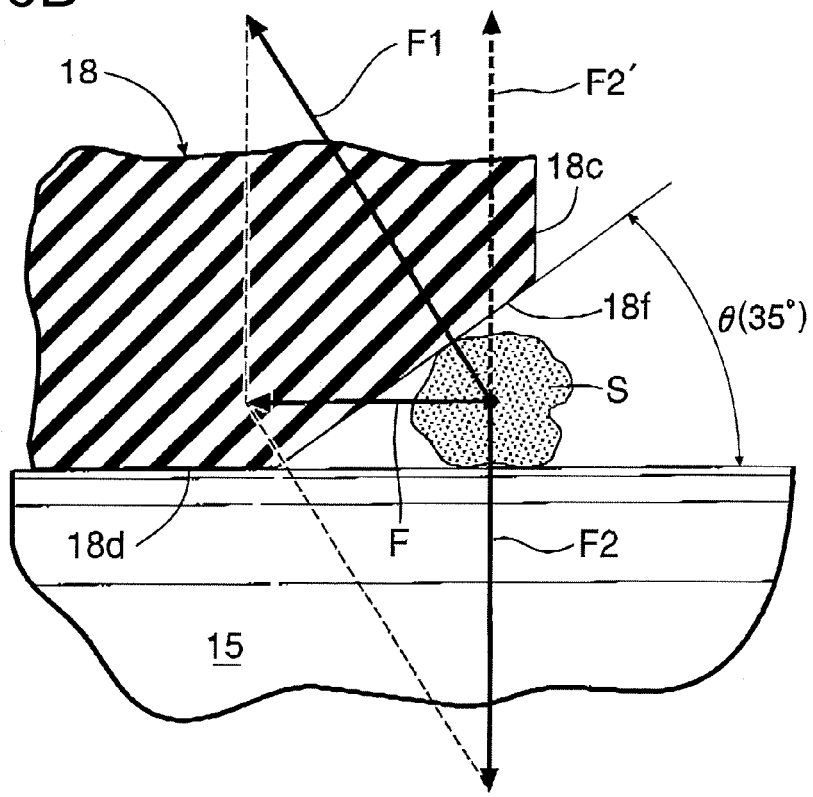

The function of preventing sand or mud from entering, exhibited by the chamfered portions 18f, is changed by the size of an acute angle θ formed by the axis L of the stabilizer bush 18 and the chamfered portions 18f. As shown in FIGS. 6A-6B, when sand S is pushed against the chamfered portion 18f in the axis L direction with a load F, the load F resolves into a component F1 in a direction perpendicular to the chamfered portion 18f and a component F2 in a direction perpendicular to the axis L, and a reaction force F2' to the component F2 in the direction perpendicular to the axis L works so as to push open the chamfered portion 18f.

FIG. 6A and FIG. 6B show cases in which the acute angle θ is 65° and 35° respectively. In the case of FIG. 6A in which the acute angle θ is large, the reaction force F2', which works so as to push open the chamfered portion 18f, is small, but in the case of FIG. 6B in which the acute angle θ is small, the reaction force F2', which works so as to push open the chamfered portion 18f, is large. When the acute angle θ is large, it is harder for a foreign body to bite into the chamfered portion 18f, and it is easier for a foreign body to be ejected once it has bitten into the chamfered portion 18f instead of it remaining there. For these reasons it is desirable that a lower limit value of the acute angle θ is 45°.

On the other hand, as described above, when the acute angle θ is close to a right angle, since the chamfered portion 18f is pushed outward in the axis L direction and opens in a way such that it turns up due to the load that works to compress the stabilizer bush 18 radially inwardly, it is desirable that an upper limit of the acute angle θ is 75°. It is therefore possible, by setting the acute angle θ in the range of 45° to 75°, to prevent a foreign body from biting into the chamfered portion 18f and prevent it being difficult to eject a foreign body that has bitten in, while making it difficult for the open end of the inner peripheral face 18d of the stabilizer bush 18 to be opened.

Furthermore, since the C-shaped recess 18k disposed so as to surround the axis L is formed on the side face of the stabilizer bush 18 so as to avoid the slit 18e section, it is possible by means of the recess 18k to reduce the rigidity of the section, excluding the vicinity of the slit 18e, of the side face of the stabilizer bush 18, and only the rigidity of the vicinity of the slit 18e is increased compared with other sections, thereby suppressing opening of the slit 18e yet more effectively.

Moreover, when the left and right wheels W and W move vertically in phase and the torsion portion 15 of the stabilizer 14 rotates, the outer peripheral face of the torsion portion 15 and the inner peripheral face d of the stabilizer bush 18 rotate relative to each other, but if the contact surface pressure between the sliding faces thereof is too high, there is a possibility that the relative rotation will not take place smoothly and the ride comfort of the vehicle will be degraded. On the other hand, when the contact surface pressure of the sliding faces is too low, although the relative rotation takes place smoothly and the ride comfort of the vehicle improves, the slits 18e and 18e of the stabilizer bush 18 open from sections connected to the inner peripheral faces 18d and 18d, and there is a possibility that sand and mud will enter from the gap formed therein to thus cause the occurrence of abnormal noise or wear. In the present embodiment, opening of the slit 18e is prevented while enabling the stabilizer bush 18 and the torsion portion 15 to easily undergo relative rotation, thereby preventing sand and mud from entering.

That is, when the stabilizer bush 18 is clamped between the vehicle body 19 and the mounting bracket 21 and compressed radially inwardly, since the recesses 18h and 18h are formed in the intermediate section in the axis L direction of the second outer peripheral face 18b of the stabilizer bush 18, the rigidity of the vicinity of the recesses 18h and 18h decreases, and the contact surface pressure between the outer peripheral face of the torsion portion 15 and the inner peripheral face 18d of the stabilizer bush 18 thereby decreases. The effect of reducing the contact surface pressure is exhibited yet more effectively by setting the average thickness α of the resilient thin membrane 18i less than the average depth β of the recess 18h and the length γ in the width direction. This is because in accordance with the above-mentioned arrangement the resilient thin membrane 18i becomes thin, and a sufficient area is guaranteed for the resilient thin membrane 18i.

FIG. 7 shows the distribution of contact surface pressure between the inner peripheral face 18d and the torsion portion 15 when pressure is radially inwardly applied evenly to the first and second outer peripheral faces 18a and 18b of the stabilizer bush 18, and it can be seen that the contact surface pressure of a section where the recesses 18h and 18h are present is decreased.

On the other hand, since no recesses 18h and 18h are formed in opposite end parts in the axis L direction of the second outer peripheral face 18b of the stabilizer bush 18, the rigidity of the opposite end parts is guaranteed, the end of the inner peripheral face 18d of the stabilizer bush 18 that opens to the side faces 18c and 18c is put in strong pressure contact with the outer peripheral face of the torsion portion 15, and the sections where the slit 18e opens on the side faces 18c and 18c are put in strong intimate contact, thereby reliably preventing a gap from being formed.

In this way, since the contact surface pressure of the sliding faces in the intermediate section in the axis L direction of the inner peripheral face 18d of the stabilizer bush 18 locally decreases, when a twisting load is applied to the torsion portion 15 of the stabilizer 14, slipping of the sliding faces starts from the intermediate section in the axis L direction where the contact surface pressure is low, the slipping spreads to opposite end parts in the axis L direction where the contact surface pressure is high, and the entire region of the sliding faces is quickly and smoothly shifted to a slipping state, thereby enhancing the ride comfort of the vehicle. Moreover, due to the absence of the recesses 18h and 18h it is possible to guarantee sufficient contact surface pressure for the sliding faces in the opposite end parts in the axis L direction of the inner peripheral face 18d of the stabilizer bush 18, from which sand and mud easily enter, thus preventing the slit 18e from opening and thereby reliably preventing sand and mud from entering.

Furthermore, when the left and right wheels W and W move vertically with opposite phases and the torsion portion 15 of the stabilizer 14 twistedly deforms, a vertical load is inputted into the stabilizer bushes 18 and 18 supporting opposite ends of the torsion portion 15, but since the recesses 18h and 18h of the stabilizer bush 18 are formed on the vehicle body front side and the vehicle body rear side of the torsion portion 15, it is possible to prevent excessive deformation by guaranteeing the rigidity of the stabilizer bush 18 toward the vertical load, thus stabilizing supporting of the stabilizer 14 by means of the stabilizer bush 18.

Figure 8:
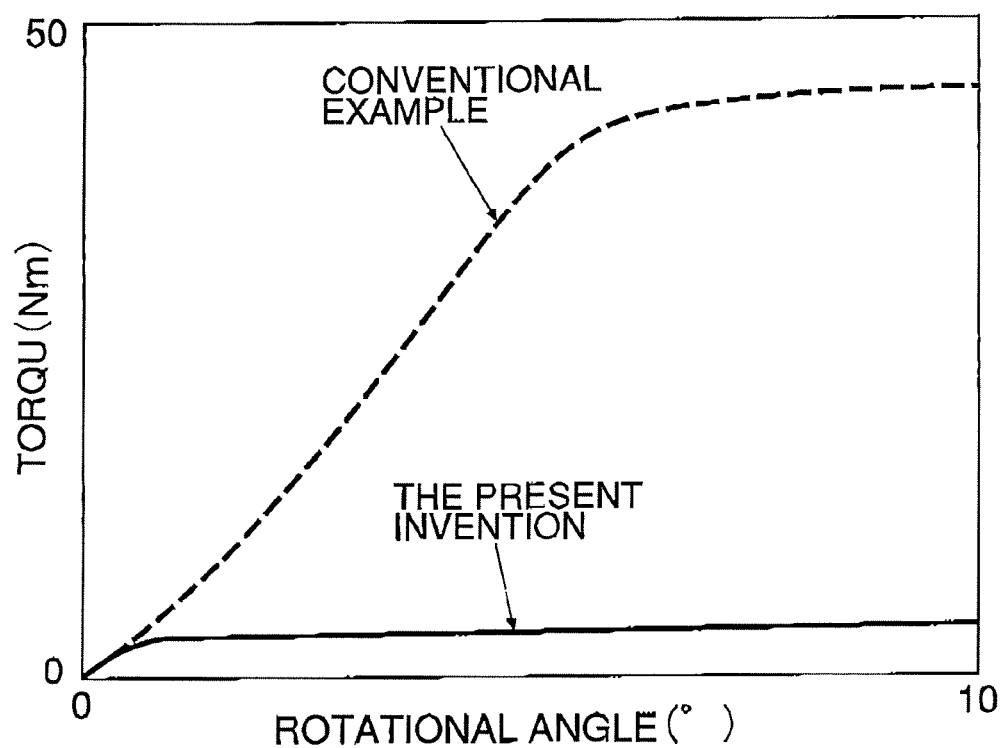
FIG. 8 is a graph for explaining the effect. (first embodiment)
Figure 9A:
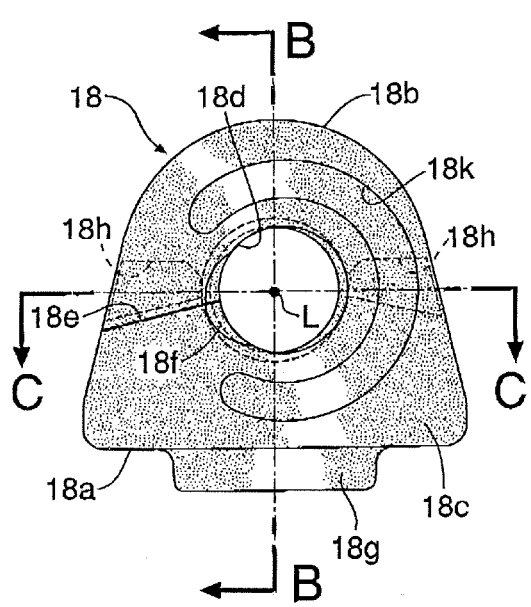
FIGS. 9A-9D are diagrams showing the shape of a stabilizer bush. (second embodiment)
Figure 9B:
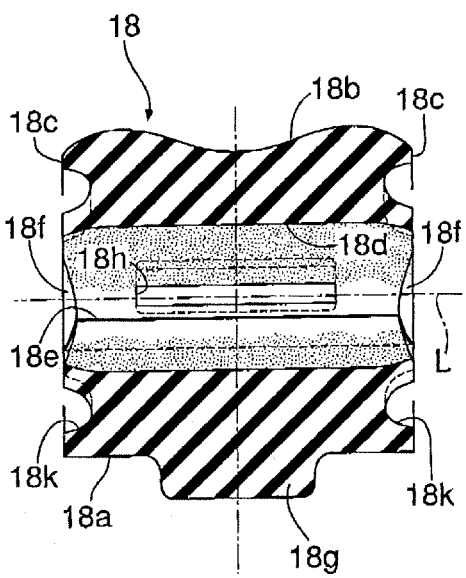
Figure 9C:
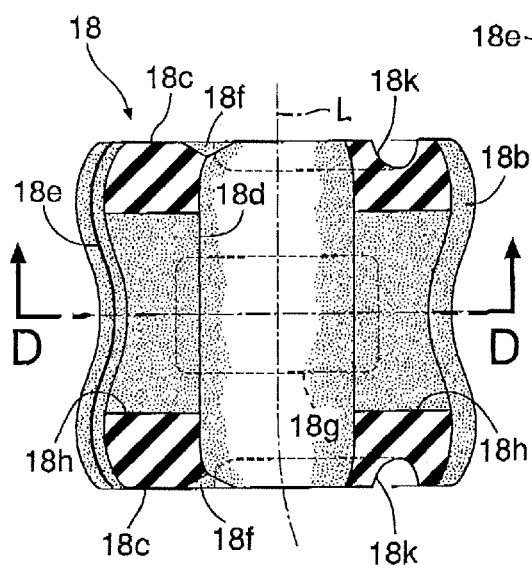
Figure 9D:
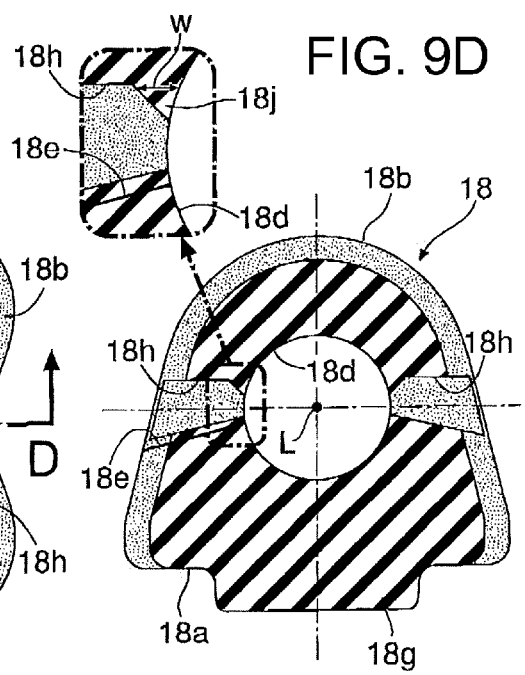

FIG. 8 shows the relationship between rotational angle of the torsion portion 15 relative to the stabilizer bush 18 and torque of the frictional force of the sliding faces that resists the rotation. The characteristics of a conventional example, denoted by the broken line, correspond to a case in which it is difficult for the sliding faces to slip, and since the torque that resists rotation increases in response to an increase in the rotational angle, there is the problem that relative rotation of the torsion portion 15 is inhibited, thus degrading the ride comfort. On the other hand, the characteristics of the embodiment, denoted by the solid line, correspond to a state in which it is easy for the sliding faces to slip, and smooth relative rotation of the torsion portion 15 is allowed, thus improving the ride comfort.

Embodiment 2

A second embodiment of the present invention is now explained by reference to FIGS. 9A-9D.

The recesses 18h and 18h of the stabilizer bush 18 of the first embodiment do not reach the inner peripheral face 18d, but recesses 18h and 18h of a stabilizer bush 18 of the second embodiment communicate with an inner peripheral face 18d. A lip 18j that is in contact with an outer peripheral face of a torsion portion 15 is formed on one side, in the circumferential direction, of a section where the recess 18h communicates with the inner peripheral face 18d. A width w in the radial direction of the lip 18j is substantially zero on the tip side thereof (lower side in the figure), and gradually increases therefrom in going toward the base side (upper side in the figure).

In accordance with this embodiment, since the recesses 18h and 18h of the stabilizer bush 18 extend through to the inner peripheral face 18d, there is no frictional force of the resilient membrane portion 18 in the first embodiment, and it is possible to further decrease the average contact surface pressure of the sliding faces. Moreover, since the lip 18j, which is in contact with the outer peripheral face of the torsion portion 15, decreases in thickness in going from the base to the tip, the contact surface pressure at the tip can be reduced to substantially zero, and the tip can function as a point where the inner peripheral face 18d of the stabilizer bush 18 and the outer peripheral face of the torsion portion 15 start to slip, thus allowing yet smoother relative rotation of the torsion portion 15 and thereby further improving the ride comfort.

Embodiments of the present invention are explained above, but the present invention may be modified in a variety of ways as long as the modifications do not depart from the spirit and scope of the present invention.

For example, the stabilizer 14 of the embodiments integrally includes the torsion portion 15, the arm portions 16 and 16, and the curved portions 17 and 17, but arm portions 16 and 16 may be formed from a separate member and fixed to opposite ends of a linear torsion portion 15 via bolts, etc.

Furthermore, in the embodiments, the strut type suspension S is illustrated, but the stabilizer 14 of the present invention may be applied to any type of suspension system.

In the embodiments, the stabilizer bush 18 is supported by being clamped between the U-shaped mounting portion 19a formed on the vehicle body 19 and the flat mounting bracket 21, but the stabilizer bush 18 may be supported on a flat face of the vehicle body 19 using a U-shaped mounting bracket.

Furthermore, in the embodiments, the arm portions 16 and 16 of the stabilizer 14 are connected to the dampers 12 and 12, but the arm portions 16 and 16 of the stabilizer 14 may be connected to the knuckles 11 and 11 or the suspension arms 10 and 10.

Moreover, the stabilizer bush 18 of the embodiments is provided with the chamfered portion 18f on the side face 18c and with the recess 18h, but they may be omitted.

Furthermore, the stabilizer bush 18 of the embodiments is provided with the two recesses 18h in the second outer peripheral face 18b, but there may be any number thereof. Moreover, the recess 18h may be provided in the first outer peripheral face 18a.

Furthermore, the vehicle body on which the stabilizer bush 18 is mounted includes a subframe.

The invention claimed is:

1. A support structure for a stabilizer in which an outer peripheral face of a torsion portion of a stabilizer that connects left and right suspension systems is gripped by an inner peripheral face of a tubular stabilizer bush, and an outer peripheral face of the stabilizer bush is clamped under pressure and fixed between a mounting part of a vehicle body and a fixing member fixed to the vehicle body,
    wherein first and second radially inwardly extending recesses is formed in an intermediate section, excluding opposite end parts, in a direction of an axis of the outer peripheral face of the stabilizer bush,
    wherein when a cross-section of the stabilizer bush in the axis direction is viewed, a bottom face of the first and second recesses is formed substantially parallel to the axis direction, wherein the stabilizer bush has a slit formed therein that provides communication from the outer peripheral face to the inner peripheral face, and a third recess is formed on an end face in the axis direction of the stabilizer bush, the third recess configured and arranged so as to avoid the slit, and
    wherein the first recess is formed only on the vehicle body front side and the second recess is formed only on the vehicle body rear side of the torsion portion, and the stabilizer bush is fixed vertically.

2. The support structure for a stabilizer according to claim 1, wherein the third recess is formed in a C shape and is situated radially outside the inner peripheral face of the stabilizer bush.

3. The support structure for a stabilizer according to claim 1, wherein a resilient membrane portion is formed between the bottom of the first and second recesses and the inner face, and an average thickness of the resilient membrane portion is smaller than an average depth of the first and second recesses.

4. The support structure for a stabilizer according to claim 3, wherein the average thickness of the resilient membrane portion is smaller than a length in the width direction of the first and second recesses that is perpendicular to both the depth direction of the first and second recesses and the axis direction.

5. A support structure for a stabilizer in which an outer peripheral face of a torsion portion of a stabilizer that connects left and right suspension systems is gripped by an inner peripheral face of a tubular stabilizer bush, and an outer peripheral face of the stabilizer bush is clamped under pressure and fixed between a mounting part of a vehicle body and a fixing member fixed to the vehicle body,
    wherein a radially inwardly extending recess is formed in an intermediate section, excluding opposite end parts, of the stabilizer bush, wherein the recess extends through to the inner peripheral face, a lip is formed on at least one side in the peripheral direction of a section where the recess communicates with the inner peripheral face, the lip being in contact with the outer peripheral face of the torsion portion, and a radial thickness of the lip increases in going from the tip side toward the base side.

6. The support structure for a stabilizer according to claim 1, wherein the stabilizer bush has a geometrically-shaped positioning projection formed thereon at lower central portion thereof, and wherein the fixing member comprises a bracket having an opening formed therein which is configured to receive the positioning projection.

7. A support method for a stabilizer in which an outer peripheral face of a torsion portion of a stabilizer that connects left and right suspension systems is gripped by an inner peripheral face of a tubular stabilizer bush, and an outer peripheral face of the stabilizer bush is clamped under pressure and fixed between a mounting part of a vehicle body and a fixing member fixed to the vehicle body,
    wherein first and second radially inwardly extending recesses is formed in an intermediate section, excluding opposite end parts, in a direction of an axis of the outer peripheral face of the stabilizer bush,
    wherein when a cross-section of the stabilizer bush in the axis direction is viewed, a bottom face of the first and second recesses is formed substantially parallel to the axis direction,
    wherein the stabilizer bush has a slit formed therein that provides communication from the outer peripheral face to the inner peripheral face, and a third recess is formed on an end face in the axis direction of the stabilizer bush, the third recess configured and arranged so as to avoid the slit, and
    wherein the first recess is formed only on the vehicle body front side and the second recess is formed only on the vehicle body rear side of the torsion portion, and the stabilizer bush is fixed vertically.

8. The support method for a stabilizer according to claim 7, wherein the third recess is formed in a C shape and is situated radially outside the inner peripheral face of the stabilizer bush.

9. The support method for a stabilizer according to claim 1, wherein a resilient membrane portion is formed between the bottom of the first and second recesses and the inner face, and an average thickness of the resilient membrane portion is smaller than an average depth of the first and second recesses.

10. The support structure for a stabilizer according to claim 3, wherein the average thickness of the resilient membrane portion is smaller than a length in the width direction of the first and second recesses that is perpendicular to both the depth direction of the first and second recesses and the axis direction.

11. A support method for a stabilizer in which an outer peripheral face of a torsion portion of a stabilizer that connects left and right suspension systems is gripped by an inner peripheral face of a tubular stabilizer bush, and an outer peripheral face of the stabilizer bush is clamped under pressure and fixed between a mounting part of a vehicle body and a fixing member fixed to the vehicle body,
    wherein a radially inwardly extending recess is formed in an intermediate section, excluding opposite end parts, of the stabilizer bush, wherein the recess extends through to the inner peripheral face, a lip is formed on at least one side in the peripheral direction of a section where the recess communicates with the inner peripheral face, the lip being in contact with the outer peripheral face of the torsion portion, and a radial thickness of the lip increases in going from the tip side toward the base side.

12. The support method for a stabilizer according to claim 7, wherein the stabilizer bush has a geometrically-shaped positioning projection formed thereon at lower central portion thereof, and wherein the fixing member comprises a bracket having an opening formed therein which is configured to receive the positioning projection.

* * * * *